United States Patent [19]

Crenshaw et al.

[11] Patent Number: 5,209,534

[45] Date of Patent: May 11, 1993

[54] TAKE-APART POST HOLE DIGGING TOOL

[76] Inventors: Dewey L. Crenshaw, Rte. 2, Box 420, 916 Ave. J., Dickinson, Tex. 77539; Roland G. Cartier, 8002 Shady Willow, Tomball, Tex. 77375

[21] Appl. No.: 836,239

[22] Filed: Feb. 18, 1992

[51] Int. Cl.$^5$ ............................................. A01B 1/00
[52] U.S. Cl. ................................. 294/50.6; 172/22
[58] Field of Search ............... 294/49, 50.6, 50.7, 294/57; 172/21, 22, 371

[56] References Cited

U.S. PATENT DOCUMENTS

| | | | |
|---|---|---|---|
| 814,850 | 3/1906 | Kemmerer | 294/50.6 |
| 849,957 | 4/1907 | Zwiebel | 294/50.7 |
| 933,227 | 9/1909 | Billau | 294/50.6 |
| 1,053,730 | 2/1913 | Jensen | 294/50.6 X |
| 1,470,284 | 10/1923 | Pooler | 294/50.6 |
| 1,692,436 | 11/1928 | Deane | 172/22 X |
| 2,021,982 | 11/1935 | Byrne | 294/50.6 X |
| 2,606,055 | 8/1952 | Johnson | 294/50.6 |
| 2,708,593 | 5/1955 | Benoist | 294/50.7 |
| 2,802,689 | 8/1957 | Batstone | 294/50.7 |

FOREIGN PATENT DOCUMENTS 1603992 12/1981 United Kingdom .................. 172/22

*Primary Examiner*—Russell D. Stormer
*Assistant Examiner*—Dean J. Kramer
*Attorney, Agent, or Firm*—Kenneth A. Roddy

[57] ABSTRACT

A post hole digging tool has a semi-cylindrical blade member, an elongate handle member, and a pair of hand grip members which can be quickly and easily assembled and disassembled. The blade has a top end wall and a short cylindrical reinforcing ring at its upper end and is semi-circular in transverse cross section. The bottom edge and longitudinal edges of the blade are sharpened to provide soil penetrating surfaces. A threaded collar extends upwardly from the center of the top wall. The handle member is removably connected at its lower end to the collar on the top wall of the blade and extends upwardly in axial alignment with the central axis of the blade and has a tee-shaped portion at its top end. Each hand grip member is removably connected to the lateral ends of the tee-shaped portion and may have an outer covering of resilient material to provide a comfortable gripping surface for the hands of the user and prevent blisters. The longitudinal blade surface is rotatable about the central longitudinal axis of the blade and handle upon turning the hand grip members in clockwise or counterclockwise direction about the handle axis. The blade member, handle member, and hand grip members can be disconnected from one another whereby the tool may be disassembled and stored or transported in a compact configuration.

1 Claim, 1 Drawing Sheet

TAKE-APART POST HOLE DIGGING TOOL

BACKGROUND OF THE INVENTION

1. Field of the Invention

This invention relates generally to earth digging tools, and more particularly to a post hole digging tool having a semi-cylindrical blade, an elongate handle, and a pair of hand grips at the top end of the handle which is rotatable about a central longitudinal axis and can be disassembled and stored or transported in a compact configuration. 2. Brief Description of the Prior Art When erecting or repairing a fence, the digging of the holes for the fence posts is a laborious and time consuming task. Various digging tools have been used in the past to accomplish the digging operation.

Often a common wooden handle shovel is used, but the hole dug by this method is generally conical-shaped and much larger than necessary for the post. The larger than necessary hole makes it difficult to correctly position the post and even if initially positioned correctly, the post will often shift or lean from the true vertical position during or after the concrete or other fill material is placed in the hole. This method is time consuming and requires a great deal of bending and lifting and sometimes results in back strain and hand blisters. Another disadvantage is that the shovel cannot be disassembled and will not easily fit in the trunk of an automobile.

Another common tool for digging post holes is a tool which has a pair of opposed curved blades pivotally connected at their top ends and a pair of elongate wooden handles which extend upwardly from the connection. The tool operates in a scissors fashion. To use this tool, the handles are held together to position the blades in vertically opposed relation and the tool is held above the hole location and then forcefully plunged into the ground. Then the handles are pulled outwardly apart from one another causing the blades to pinch together and then the soil pinched between the blades is lifted out of the ground while holding the handles apart. This method is more efficient than digging with a shovel and produces a smaller hole. However, this method is also time consuming and requires a great deal of bending and lifting in addition to the repeated pulling the handles apart and pressing them together against the resistance of the soil plug and often results in back strain and hand blisters. This tool also cannot be disassembled and will not easily fit in the trunk of an automobile.

Others have attempted to solve these problems and there are several patents which disclose various tools and implements for digging holes.

Kemmerer, U.S. Pat. No. 814,850 discloses a tool for digging holes comprising a unitary shank having a crescent-shaped blade formed at the bottom end and a cross-bar attached at the top end. The crescent-shaped blade is open at both ends. The longitudinal edges of the blade are sharpened and the lower end of the blade is tapered to a point. The handle and blade of this tool are integrally formed and cannot be disassembled.

Gillogy, U.S. Pat. No. 1,829,002 discloses a ball shaper having a replaceable flat-bottomed, semi-circular blade open at both ends with longitudinal edges which subtend slightly more than 180°. A pair of semi-circular reinforcing bands are secured to the inside and outside surfaces of the upper edge of the blade. An elongate handle secured to the back part of the blade extends upwardly parallel to, and offset from, the longitudinal axis of the blade and has a D-shaped hand grip at its upper end. The offset handle allows the tool to be forced into the ground concentric with the trunk of a tree or plant and it is repeatedly forced into the ground at circumferentially spaced locations to complete a circle pattern surrounding the tree or shrub and cutting the small roots. The construction of this tool makes it impossible to rotate the blade after it has been forced into the ground.

Pooler, U.S. Pat. No. 1,470,284 discloses a hand-held digger implement for digging up weeds which is operated by the hand and fingers of the user. The digger comprises a hollow tube member which is cut-away throughout its major portion to form a semi-cylindrical blade at the lower portion and a tubular upper portion. A wooden handle member has an elongate shank which is slidably received in the tubular portion of the blade. The shank of the handle and the tube are held together by a wedge-shaped pin passing transversly through the tube and shank of the handle. In operation, the blade is thrust into the ground near the root of the weed and given a slight turn, after which it is withdrawn by placing the fingers in engagement with the wedge pin. This is a hand-held implement similar to a flower trowel and designed for removing the roots of weeds and would not be suitable for use in digging large deep post holes.

The present invention is distinguished over the prior art in general, and these patents in particular by a post hole digging tool having a semi-cylindrical blade member, an elongate handle member, and a pair of hand grip members which can be quickly and easily assembled and disassembled. The blade has a top end wall and a short cylindrical reinforcing ring at its upper end and is semi-circular in transverse cross section. The bottom edge and longitudinal edges of the blade are sharpened to provide soil penetrating surfaces. A threaded collar extends upwardly from the center of the top wall. The handle member is removably connected at its lower end to the collar on the top wall of the blade and extends upwardly in axial alignment with the central axis of the blade and has a tee-shaped portion at its top end. Each hand grip member is removably connected to the lateral ends of the tee-shaped portion and may have an outer covering of resilient material to provide a comfortable gripping surface for the hands of the user and prevent blisters. The longitudinal blade surface is rotatable about the central longitudinal axis of the blade and handle upon turning the hand grip members in clockwise or counterclockwise direction about the handle axis. The blade member, handle member, and hand grip members can be disconnected from one another whereby the tool may be disassembled and stored or transported in a compact configuration.

SUMMARY OF THE INVENTION

It is therefore an object of the present invention to provide a post hole digging tool which will easily and quickly form a hole in the ground for the reception of fence posts and the like.

It is another object of this invention to provide a post hole digging tool having a central handle coaxial with the longitudinal axis of the blade that will form a smooth cylindrical plug of soil when rotated about the longitudinal axis which soil plug can be easily lifted out of the ground to leave a smooth cylindrical hole.

Another object of this invention is to provide a post hole digging tool which is easily assembled and can be disassembled and arranged in a compact configuration for convenient storage and shipping.

A further object of this invention is to provide a post hole digging tool which has cushioned hand grips to provide a comfortable grip for the hands of the user and to prevent blisters.

A still further object of this invention is to provide a post hole digging tool which is simple in construction, economical to manufacture, and rugged and durable in use.

Other objects of the invention will become apparent from time to time throughout the specification and claims as hereinafter related.

The above noted objects and other objects of the invention are accomplished by a post hole digging tool having a semi-cylindrical blade member, an elongate handle member, and a pair of hand grip members which can be quickly and easily assembled and disassembled. The blade has a top end wall and a short cylindrical reinforcing ring at its upper end and is semicircular in transverse cross section. The bottom edge and longitudinal edges of the blade are sharpened to provide soil penetrating surfaces. A threaded collar extends upwardly from the center of the top wall. The handle member is removably connected at its lower end to the collar on the top wall of the blade and extends upwardly in axial alignment with the central axis of the blade and has a tee-shaped portion at its top end. Each hand grip member is removably connected to the lateral ends of the tee-shaped portion and may have an outer covering of resilient material to provide a comfortable gripping surface for the hands of the user and prevent blisters. The longitudinal blade surface is rotatable about the central longitudinal axis of the blade and handle upon turning the hand grip members in clockwise or counterclockwise direction about the handle axis. The blade member, handle member, and hand grip members can be disconnected from one another whereby the tool may be disassembled and stored or transported in a compact configuration.

DESCRIPTION OF THE PREFERRED EMBODIMENT

Figure 1:
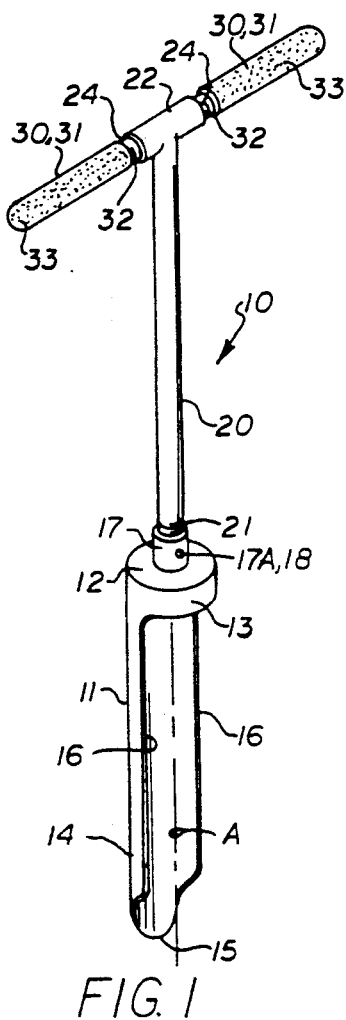
FIG. 1 is an isometric view of the post hole digging tool in accordance with the present invention shown in the assembled condition.
Figure 2:
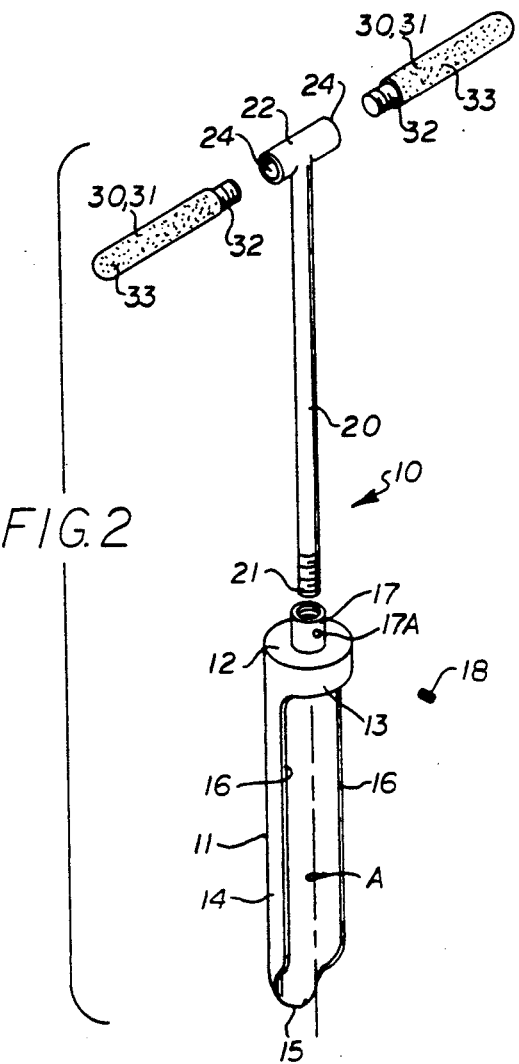
FIG. 2 is an exploded isometric view of the post hole digging tool in a disassembled condition.
Figure 3:
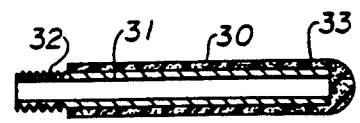
FIG. 3 is a longitudinal cross section through one of the hand grip members of the post hole digging tool.

Referring to the drawings by numerals of reference, there is shown in FIGS. 1, 2, and 3, a preferred post hole digging tool 10. The digging tool 10 has a blade member 11, a handle member 20, and a pair of hand grip members 30.

The blade 11 is a hollow cylindrical member enclosed at its top end by a top wall 12 and is cut-away along its length a distance from its bottom end to leave a short cylindrical portion 13 at its upper end and a semi-cylindrical longitudinal wall 14. The longitudinal wall 14 is semi-circular in transverse cross section. The short cylindrical portion 13 serves as a cylindrical reinforcing ring at the upper end of the blade to strengthen the blade and prevent it from twisting under heavy torque loads. The bottom edge 15 curves downwardly and the bottom edge and longitudinal edges 16 of the blade are sharpened or beveled to provide soil penetrating surfaces. An internally threaded collar 17 is secured to the center of the top wall 12 in alignment with the longitudinal axis A of the blade 11. A set screw 18 is threadedly received in a threaded hole 17A in the side wall of the collar 17.

The handle member 20 is an elongate tubular member having exterior threads 21 at its bottom end and a tee-shaped portion 22 at its top end. The handle 20 is threadedly received in the threaded collar 17 at the top wall 12 of the blade 11 and extends upwardly from the top wall of the blade in axial alignment with the axis A of the blade. The set screw 18 is tightened against the lower portion 21 of the handle 20 to further secure the handle to the blade 11 and prevent accidental unthreading of the connection. The lateral ends 24 of the tee-shaped portion 22 of the handle 20 are internally threaded.

As best seen in FIG. 3, each hand grip member 30 is constructed of a rod or tubular member 31 having exterior threads 32 on one end which are threadedly received in the threaded lateral ends 24 of the handle tee-shaped portion 22. Preferably, each hand grip member has an outer covering 33 of resilient material, such a foam rubber, to provide a comfortable gripping surface for the hands of the user and prevent blisters.

Figure 4:
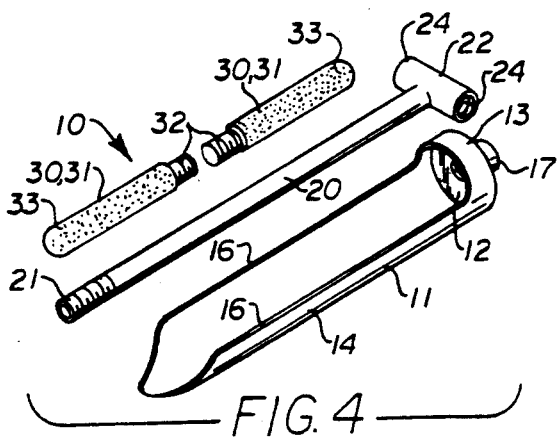
FIG. 4 is an exploded isometric view of the post hole digging tool in a disassembled condition arranged in a compact configuration for storage and shipping.

One of the main features of the present invention is that it can be disassembled into individual components and stored in a small container and easily transported, as illustrated in FIG. 4. To disassemble the tool 10, the set screw 18 is loosened and the handle is unscrewed from the collar 17 and the hand grip members 30 are unscrewed from the tee-shaped portion 22. The disassembled components can then be placed parallel to one another and placed in a storage container or carrying bag which will easily fit in a small space, such as the trunk of an automobile.

Because the tool can be disassembled, it allows a much longer blade portion to be provided than is available with other commercially available digging tools which results in removing more soil during a single operation.

The post hole digging tool 10 is simple in construction and inexpensive to manufacture and can easily be shipped in a compact package.

OPERATION

The post hole digging tool is assembled by screwing the threaded end 21 of the handle 20 into the threaded collar 17 at the top wall 12 of the blade and then tightening the set screw 18 down on the threaded lower portion 21 of the handle 20 to secure the connection and prevent the handle from becoming loosened during use. The threaded ends 32 of the hand grip members 30 are screwed into the threaded lateral ends 24 of the tee-shaped portion 22 of the handle 20.

The location for the post holes is first determined. In some dry soil conditions, is is recommended to wet the area where the hole is to be dug. The tool is used in the manner of a shovel to remove a layer of sod and about one cup of water is poured into the ground where the sod was removed.

The tool is then gripped by the hand grips and the bottom edge of the semi-circular blade is placed on the ground to partially encircle the centerpoint of the post location when the tool is in a vertical position and the blade is then forced down into the ground.

The user then rotates the blade at least 180°, about the longitudinal axis of the tool. Since the handle is disposed centrally and coaxially aligned with the longitudinal axis of the blade, the cutting surfaces of the longitudinal edges of the blade will cut a circle surrounding the centerpoint of the post location and form a smooth cylindrical plug of soil when rotated.

It is recommended that the handle be turned twice to assure that the soil plug is fully cut. The water follows the edge of the blade and the moist soil is sufficiently sticky to cause the soil plug to stick to the blade when the blade is lifted vertically and the soil plug can be easily lifted out of the ground to leave a smooth cylindrical hole.

Depending upon the desired depth of the hole to be dug and on the soil conditions, after the first soil plug has been removed, another cup of water is poured into the previously dug hole, the blade is placed into the hole and again forced into the ground and then rotated and lifted out to remove another soil plug. This process is repeated until the desired hole depth is achieved.

After all the holes have been dug, the tool can be disassembled by loosening the set screw and unscrewing the handle from the collar at the top of the blade and unscrewing the hand grip members from the tee-shaped portion of the handle. The disassembled components can then be placed parallel to one another and placed in a storage container or carrying bag for storage or transporting to another job site.

While this invention has been described fully and completely with special emphasis upon a preferred embodiment, it should be understood that within the scope of the appended claims the invention may be practiced otherwise than as specifically described herein.

We claim:
1. A take-apart post hole digging tool comprising:
a hollow semi-cylindrical blade member having a top wall at its upper end with a cylindrical reinforcing ring portion extending a short distance downwardly therefrom, parallel longitudinal side edges extending downwardly from said ring portion and terminating in a downwardly curved bottom edge, said longitudinal side edges and bottom edge defining a longitudinal blade surface semi-circular in transverse cross section about a central longitudinal axis, said longitudinal side edges and said bottom edge sharpened to provide soil penetrating surfaces,
an internally threaded collar secured on said top wall in axial alignment with said central longitudinal axis,
an elongate handle member having an internally threaded tee-shaped portion at its upper end and an externally threaded portion at its bottom end threadedly received and removably connected to said collar and having a longitudinal axis coaxial with said central longitudinal axis,
releasable lock means operatively connected with said handle and said collar threaded connection to prevent accidental unthreading upon rotation, and
a pair of hand grip members each having an externally threaded portion at one end threadedly received and removably connected in said handle tee-shaped portion to extend laterally outward therefrom and each having an outer covering of resilient material for providing a comfortable gripping surface for the hand of a user,
said longitudinal blade surface being rotatable about said central longitudinal axis and said coaxial handle axis upon turning said hand grip members in clockwise or counterclockwise direction about said handle axis and said cylindrical reinforcing ring portion reinforcing and reducing torque stress forces on said semi-cylindrical longitudinal blade surface when rotated in soil, and
said blade member, handle member, and hand grip members being selectively disconnected from one another whereby said tool may be disassembled and stored or transported in a compact configuration.

* * * * *